(12) United States Patent
Watanabe et al.

(10) Patent No.: US 10,755,285 B2
(45) Date of Patent: Aug. 25, 2020

(54) SECURED MUTUAL CONFIRMATION METHOD AND SYSTEM FOR TRACING AND VERIFYING PRODUCT IDENTITY, ORIGIN AND AUTHENTICATION

(71) Applicants: Hiroshi Watanabe, Yokohama (JP); Haining Fan, Brea, CA (US)

(72) Inventors: Hiroshi Watanabe, Yokohama (JP); Haining Fan, Brea, CA (US)

(*) Notice: Subject to any disclaimer, the term of this patent is extended or adjusted under 35 U.S.C. 154(b) by 346 days.

(21) Appl. No.: 15/918,498

(22) Filed: Mar. 12, 2018

(65) Prior Publication Data
US 2019/0244215 A1    Aug. 8, 2019

Related U.S. Application Data

(60) Provisional application No. 62/625,922, filed on Feb. 2, 2018.

(51) Int. Cl.

| | |
|---|---|
| *G06Q 30/00* | (2012.01) |
| *G06Q 30/06* | (2012.01) |
| *G06Q 10/08* | (2012.01) |
| *H04L 9/32* | (2006.01) |
| *G06K 19/08* | (2006.01) |
| *G06K 19/06* | (2006.01) |
| *G06K 19/07* | (2006.01) |

(52) U.S. Cl.
CPC ....... *G06Q 30/018* (2013.01); *G06Q 10/0833* (2013.01); *G06Q 30/0635* (2013.01); *H04L 9/3236* (2013.01); *H04L 9/3247* (2013.01); *G06K 19/06037* (2013.01); *G06K 19/0723* (2013.01); *G06K 19/08* (2013.01); *G06Q 2220/00* (2013.01)

(58) Field of Classification Search
CPC .. G06Q 30/018; G06Q 30/0185; G06Q 30/06; G06Q 30/0601; G06Q 30/0609; G06Q 30/0633; G06Q 30/0635; G06Q 10/083; G06Q 10/0833; H04L 9/3236; H04L 9/3239; H04L 9/3242; H04L 9/3247; H04L 9/3249
See application file for complete search history.

(56) References Cited

U.S. PATENT DOCUMENTS

| | | | | |
|---|---|---|---|---|
| 6,738,749 | B1* | 5/2004 | Chasko | G06Q 20/105 705/16 |
| 2004/0230528 | A1* | 11/2004 | Chu | G06Q 30/06 705/50 |

(Continued)

*Primary Examiner* — Jung W Kim
*Assistant Examiner* — Adrian Stoica
(74) *Attorney, Agent, or Firm* — Che-Yang Chen; Law Office of Michael Chen

(57) ABSTRACT

A secured mutual confirmation method for tracing and verifying product identity, origin and authentication may comprise at least a seller and at least a buyer, and a series of transactions between the seller and the buyer that can be realized in an online system. The transactions comprise purchase order (PO), real shipment (RS) and shipment confirmation (SC), and one block comprising a set of PO, RS and SC is configured to be registered by a concept of blockchain. In the present invention, all processes of the transactions in the system between the seller and the buyer are monitored and the messages therebetween are encrypted, which makes the online transaction more secured and reliable for both the seller and the buyer.

3 Claims, 10 Drawing Sheets

(56) References Cited

U.S. PATENT DOCUMENTS

| | | | |
|---|---|---|---|
| 2011/0211727 A1* | 9/2011 | Costa | H04L 63/08 |
| | | | 382/100 |
| 2012/0084135 A1* | 4/2012 | Nissan | G06Q 30/06 |
| | | | 705/14.38 |
| 2015/0235235 A1* | 8/2015 | Koren | G06Q 30/0185 |
| | | | 705/318 |
| 2015/0269570 A1* | 9/2015 | Phan | G06Q 20/382 |
| | | | 705/71 |
| 2017/0032382 A1* | 2/2017 | Shulman | G06Q 30/0185 |
| 2018/0012311 A1* | 1/2018 | Small | G06Q 30/0185 |
| 2018/0240134 A1* | 8/2018 | Camenisch | G06Q 30/0185 |

* cited by examiner

SECURED MUTUAL CONFIRMATION METHOD AND SYSTEM FOR TRACING AND VERIFYING PRODUCT IDENTITY, ORIGIN AND AUTHENTICATION

FIELD OF THE INVENTION

The present invention relates to a secured mutual confirmation method and system, and more particularly to a secured mutual confirmation method and system for tracing and verifying product identity, origin and authentication.

BACKGROUND OF THE INVENTION

As time progresses and the development of the internet, online shopping has become a big part of human life. Online shopping is one of the products developed from the internet, bank and modern logistic industry; and through the internet, people can buy or sell goods or services without limitation at anytime and anywhere. After selecting the goods or services, the buyer can complete purchase through online banking transaction, and the seller can ship the goods through logistic companies after receiving the money, which is easy and saves time and effort for both sides.

However, online shopping may be disadvantageous because some unscrupulous vendors start selling counterfeits or inferior products, which are different in looks or qualities from the description shown on the internet, and it is always hard to get the money back when the buyers received the goods and found themselves deceived. Therefore, there remains a need for a new and improved design for a secured mutual confirmation method for tracing and verifying product identity, origin and authentication to overcome the problems presented above.

SUMMARY OF THE INVENTION

In one aspect, the present invention provides a secured mutual confirmation method for tracing and verifying product identity, origin and authentication, which comprises at least a seller and at least a buyer, and a series of transactions between the seller and the buyer that can be realized in an online system. The transactions may include at least one purchase order (PO), real shipment (RS) and shipment confirmation (SC), and one block comprising a set of PO, RS and SC is configured to be registered by a concept of blockchain. Moreover, once registered, the block cannot be manipulated. The seller has a first public key and a first secret key while the buyer comprises a second public key and a second secret key, wherein the first public key is the address of the seller, and the second public key is the address of the buyer. In one embodiment, in the purchase order (PO), the second public key can be used to indicate who has ordered the product. Furthermore, for example, on seller's website, each of the products has a serial number which is configured to identify which product has been ordered in the system, and the buyer can download the serial number indicating the product to be ordered and the first public key indicating the seller from the website. Additionally, the first public key is adapted to indicate the destination address of the PO. In the PO transaction, after the product is ordered, the second public key and the serial number are sent from the buyer to the seller, and the seller can generate a PO confirmation.

In the process of sending PO, the buyer in the system can generate a first hash value by hashing the second public key, a charge of the product to be ordered, and the serial number of the product. The charge in the PO transaction can be any kind of electric money or code issued by credit card companies or financial institutions. Additionally, the buyer can further generate a first E-signature by encrypting the first hash value and the first public key through the second secret key. The first hash value and the first E-signature are sent to the seller in the system. In the PO confirmation process, the seller decodes the first E-signature with the second public key to generate a code-A1 and a code-B1, and if the code-A1 and the code-B1 are respectively identical to the first public key and the first hash value, the PO is confirmed, and the seller can obtain the information of the buyer. On the other hand, if the PO is not confirmed, the order fails that happens when the buyer does not pay for orders for instance. Therefore, the system can prevent people from unscrupulously placing orders which leads to the loss of the seller.

After the PO is confirmed, the seller performs the real shipment (RS). In the process of real shipment (RS), the seller generates the second hash value by hashing the first public key, the first hash value and the first E-signature. Also, the seller further generates a second E-signature by encrypting at least the second hash value with the first secret key. Moreover, an RFID-a is generated by encrypting the second hash value or both the second public key and the second hash value while an RFID-b is generated by encrypting the second E-signature with the second public key. The RFID-a and the RFID-b can be attached to, buried in or sealed in the product which is shipped to the buyer in a shipped body. In case that the product is a bottle such as a wine bottle, the RFID-a can be attached to the bottle while the RFID-b can be included in a film to cover/protect a cork of the bottle. Thus, if the RFID-a is broken or removed from the bottle, the buyer can easily tell there may be something wrong during the shipping process. Similarly, if the RFID-b is broken, it may indicate that the wine may be at least opened during the shipping process.

There are at least two methods for the buyer to confirm the received product. For the first method, the buyer can decode data saved in the RFID-b with the second secret key so as to get the second E-signature, and then the buyer decodes the second E-signature with the first public key to get a code-B2. If the code-B2 is identical to the second hash value, the receiving of the product is confirmed. For the second method, comparing with the first method, the buyer needs to additionally decode the RFID-a with the second secret key (22) to get a code-C2, and only if both of the buyer and the seller are correct, the code-C2 and the code-B2 are identical to the second hash value. In other words, if either the code-C2 or the code B2 is not identical to the second hash value, the confirmation is failed. If the receiving is confirmed, the buyer can trust that the received product is the same as what he/she ordered. Otherwise, there might be some manipulations of the product occurred during the shipment. It is noted that the RFID-a can be disposed at a position away from the RFID-b to prevent the two RFIDs from being broken at the same time.

The last transaction between the seller and the buyer is sending the request of shipment confirmation (SC) from the buyer. After successfully receiving the product, the buyer can send the SC to the seller. In the process of shipment confirmation (SC), the buyer can generate a third hash value by hashing the second public key, the second hash value and the second E-signature, and then the buyer generates a third E-signature by encrypting the first public key and the third hash value with the second secret key. Thereafter, the buyer sends the third E-signature and the third hash value to the seller. The final step of the SC process is that the seller checks shipment confirmation by decoding the third E-signature with the second public key so as to generate a code-A3 and a code-B3, and if the code-A3 and the code-B3 are identical to the first public key and the third hash value respectively, the shipment is confirmed.

Comparing with conventional online transactions, the present invention is advantageous because all transactions in the system between the seller and the buyer are monitored and the messages therebetween are encrypted, which makes the online transaction more reliable and safer for both of the seller and the buyer.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
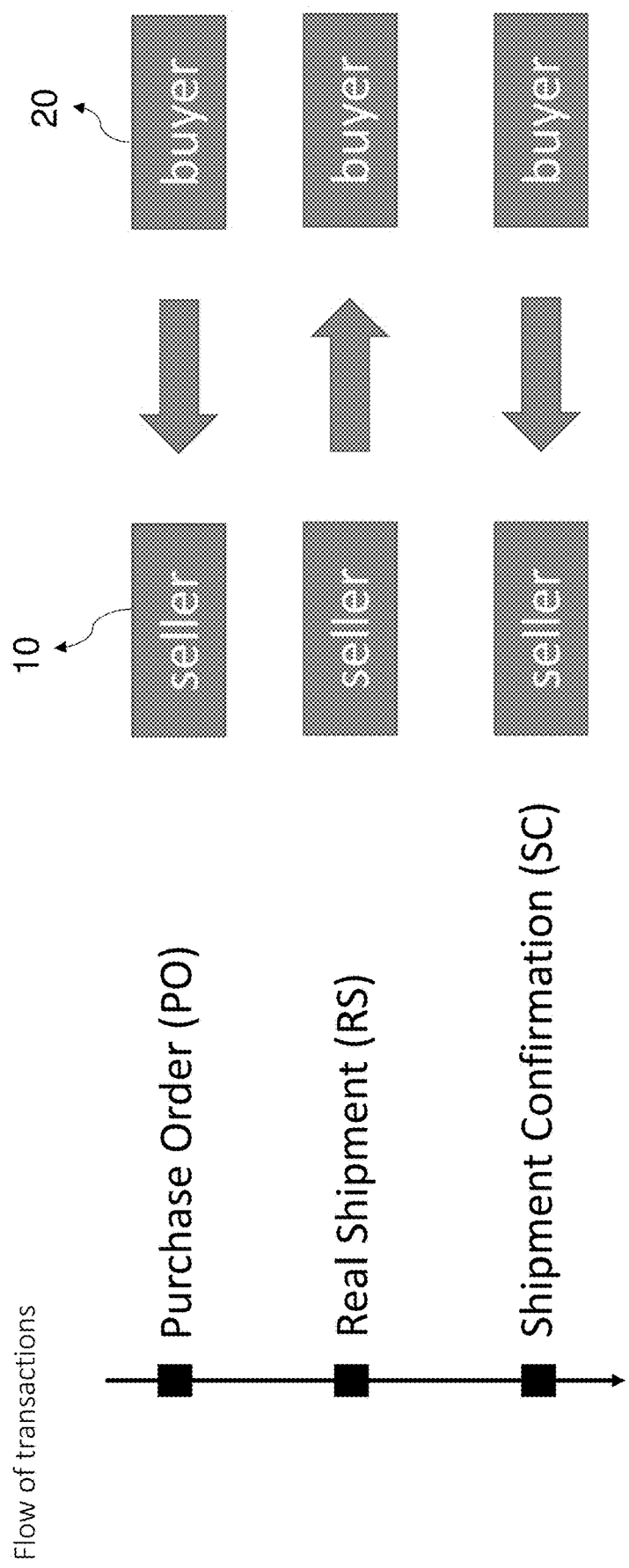
FIG. 1 is a flow chart of transactions between a seller and a buyer in a secured mutual confirmation method for tracing and verifying product identity, origin and authentication in the present invention.
Figure 2:
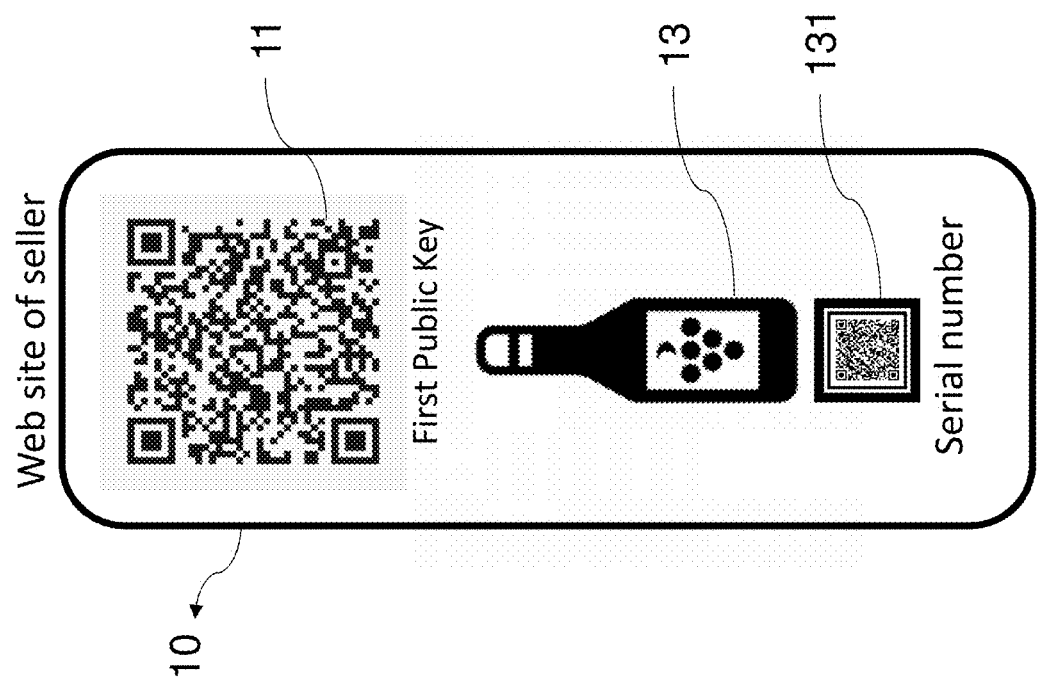
FIG. 2 is a schematic view of a website of the seller in the secured mutual confirmation method in the present invention.

In order to further understand the goal, characteristics and effect of the present invention, a number of embodiments along with the drawings are illustrated as following:

In one aspect, referring to FIGS. 1 to 2, the present invention provides a secured mutual confirmation method for tracing and verifying product identity, origin and authentication, which comprises at least a seller (10) and at least a buyer (20), and a series of transactions between the seller (10) and the buyer (20) that can be realized in an online system. The transactions may include at least one purchase order (PO), real shipment (RS) and shipment confirmation (SC), and one block comprising a set of PO, RS and SC is configured to be registered by a concept of blockchain. Moreover, once registered, the block cannot be manipulated. The seller (10) has a first public key (11) and a first secret key (12) while the buyer (20) comprises a second public key (21) and a second secret key (22), wherein the first public key (11) is the address of the seller (10), and the second public key (21) is the address of the buyer (20). In one embodiment, in the purchase order (PO), the second public key (21) can be used to indicate who has ordered the product. Furthermore, for example, on seller's website, each of the products (13) has a serial number (131) which is configured to identify which product has been ordered in the system, and the buyer (20) can download the serial number (131) indicating the product (13) to be ordered and the first public key (11) indicating the seller (10) from the website. Additionally, the first public key (11) is adapted to indicate the destination address of the PO. In the PO transaction, after the product (13) is ordered, the second public key (21) and the serial number (131) are sent from the buyer (20) to the seller (10), and the seller (10) can generate a PO confirmation.

In one embodiment, the tax bureau is configured to join the blockchain, and the block of tax return is configured to be filed with tax office automatically, which can reduce any cost related to tax return process.

In another embodiment, the buyer (20) can download a corresponding application to generate his/her own second public key (21) and the second secret key (22).

Figure 3:
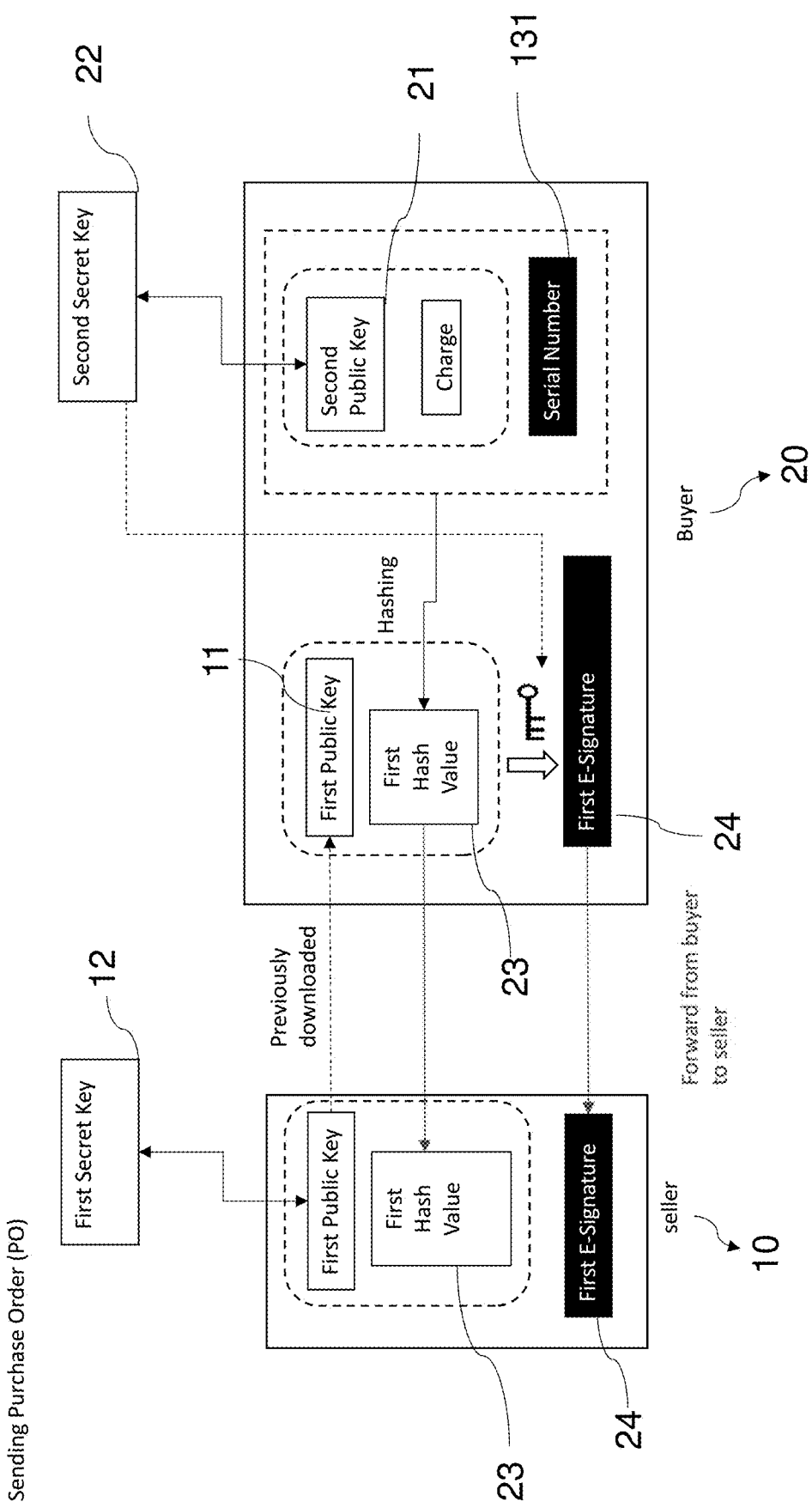
FIG. 3 is a diagram showing the purchase order process between the seller and the buyer in the secured mutual confirmation method in the present invention.
Figure 4:
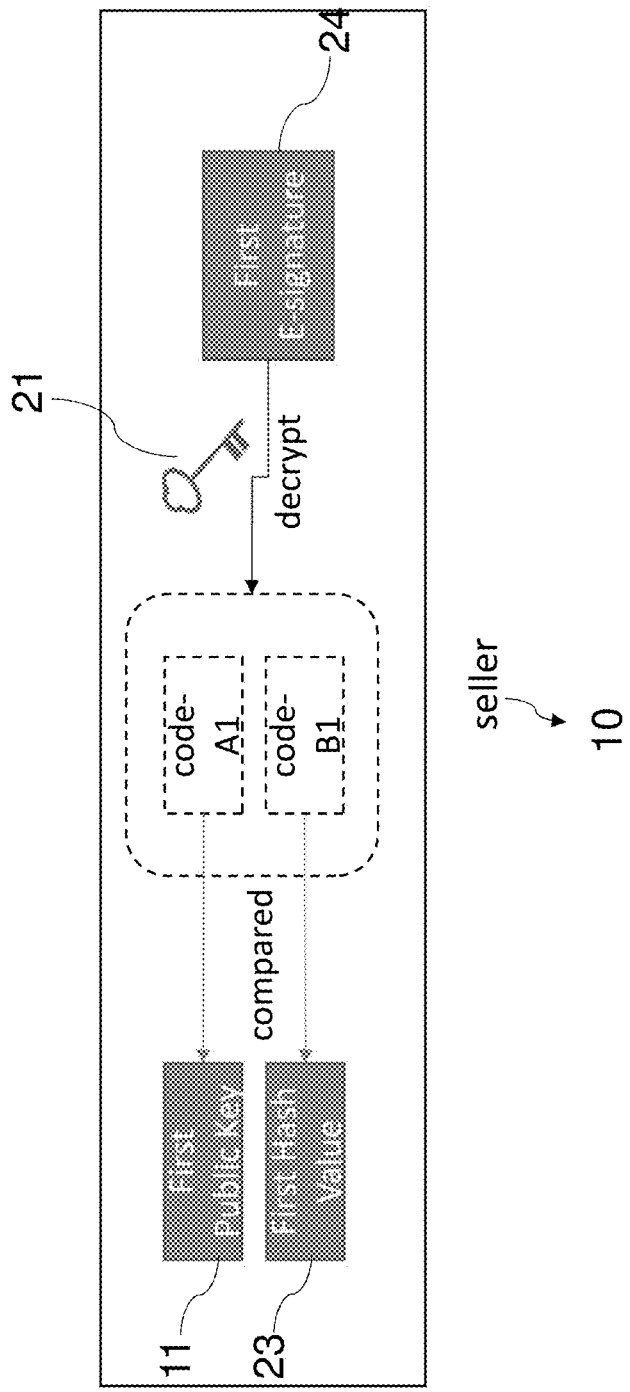
FIG. 4 is a diagram showing purchase order confirmation in the secured mutual confirmation method in the present invention.

In the process of sending PO, referring to FIG. 3, the buyer (20) in the system can generate a first hash value (23) by hashing the second public key (21), a charge of the product (13) to be ordered, and the serial number (131) of the product (13). The charge in the PO transaction can be any kind of electric money or code issued by credit card companies or financial institutions. Additionally, the buyer (20) can further generate a first E-signature (24) by encrypting the first hash value (23) and the first public key (11) through the second secret key (22). The first hash value (23) and the first E-signature (24) are sent to the seller (10) in the system. In the PO confirmation process, the seller (10) decodes the first E-signature (24) with the second public key (21) to generate a code-A1 and a code-B1, and if the code-A1 and the code-B1 are respectively identical to the first public key (11) and the first hash value (23), the PO is confirmed as shown in FIG. 4, and the seller (10) can obtain the information of the buyer (20). On the other hand, if the PO is not confirmed, the order fails that happens when the buyer (20) does not pay for orders for instance. Therefore, the system can prevent people from unscrupulously placing orders which leads to the loss of the seller (10).

In one embodiment, the code may be related to all necessary information of the credit card holder to pay for the order. In another embodiment, bitcoin or other cryptocurrency can be used for the PO transaction.

Figure 5:
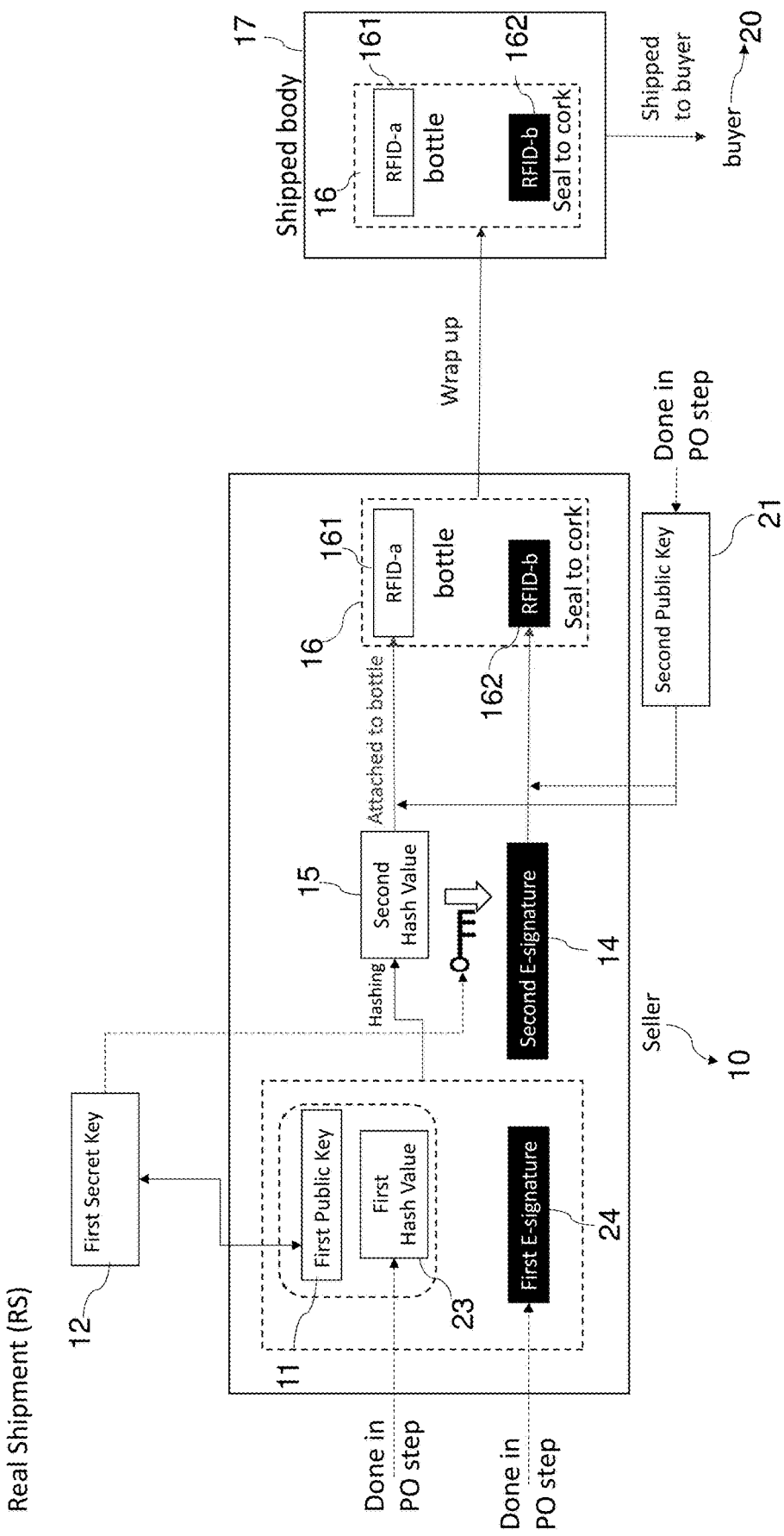
FIG. 5 is a diagram showing the real shipment process between the seller and the buyer in the secured mutual confirmation method in the present invention.
Figure 6:
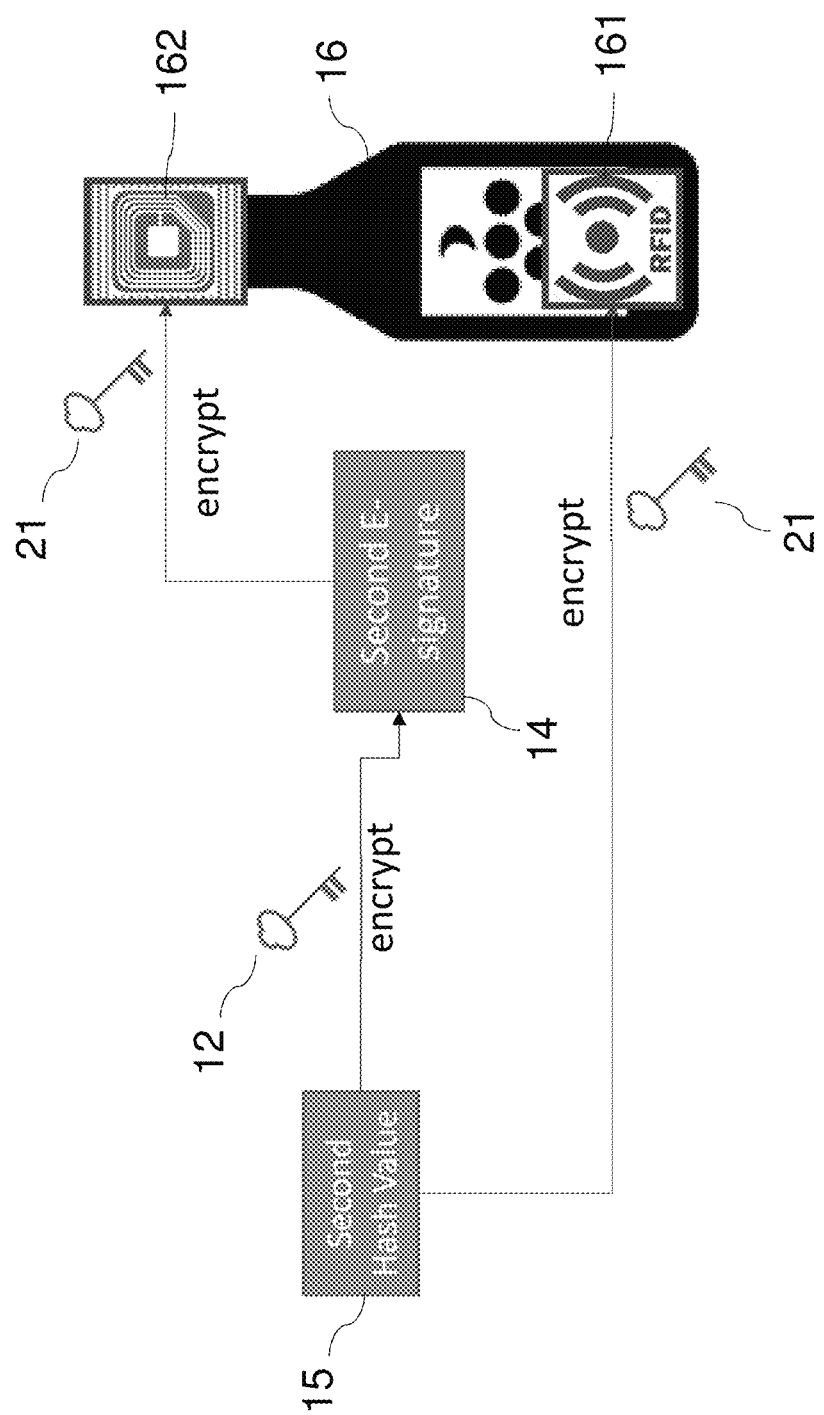
FIG. 6 is a diagram showing a second hash value generated by the seller that is encrypted to generate a RFID-a and a RFID-b in the secured mutual confirmation method in the present invention.

Referring to FIG. 5, after the PO is confirmed, the seller (10) performs the real shipment (RS). In the process of real shipment (RS), the seller (10) generates the second hash value (15) by hashing the first public key (11), the first hash value (23) and the first E-signature (24). Also, the seller (10) further generates a second E-signature (14) by encrypting at least the second hash value (15) with the first secret key (12). Moreover, an RFID-a (161) is generated by encrypting the second hash value (15) or both the second public key (21) and the second hash value (15) while an RFID-b (162) is generated by encrypting the second E-signature (14) with the second public key (21) (as shown in FIG. 6). The RFID-a (161) and the RFID-b (162) are configured to be attached to, buried in or sealed in the product (13) which is shipped to the buyer (10) in a shipped body (17). In case that the product (13) is a bottle (16) such as a wine bottle, the RFID-a (161) can be attached to the bottle (16) while the RFID-b (162) can be included in a film to cover/protect a cork of the bottle (16). Thus, if the RFID-a (161) is broken or removed from the bottle (16), the buyer (20) can easily tell there may be something wrong during the shipping process. Similarly, if the RFID-b (162) is broken, it may indicate that the wine may be at least opened during the shipping process.

In another embodiment, the RFID-a (161) can be buried in the bottle (16). In addition, the RFIDs (161)(162) may have to be endurable to environmental changes such as temperature change and humidity change. Therefore, through the use of RFIDs (161)(162), the buyer (20) can easily tell whether the product (13) is the one he/she actually ordered.

People may try to copy the data from RFID-a (161) to another fake RFID attached on another bottle. However, since the second secret key (22) is indispensable to decrypt data saved in RFID-b (162), only the buyer (20) can confirm the shipment. Furthermore, Physically Unclonable Functions (PUF) or copy-protection is assumed in the RFIDs attached to or buried in the product (13). Also, the seller (10) can send the second hash value (15) to the buyer (20) separately from the RS process.

In one embodiment, the seller (10) generates the second E-signature (14) by encrypting the second public key (21) and the second hash value (15) with the first secret key (12).

In another embodiment, each of RFIDs (161)(162) comprises a function to detect hysteresis of environmental change during shipping.

Figure 7:
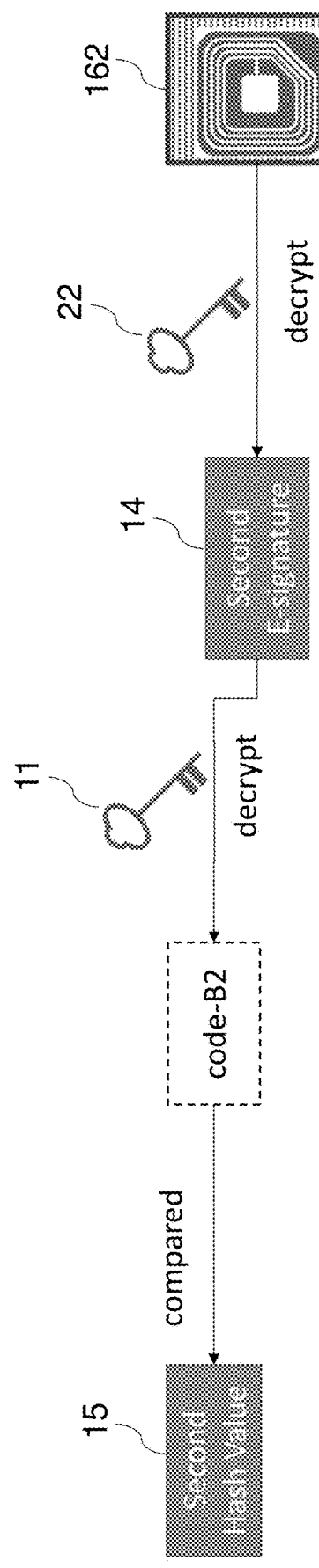
FIG. 7 is a diagram showing the process of a first method of the receiving confirmation in the secured mutual confirmation method in the present invention.
Figure 8:
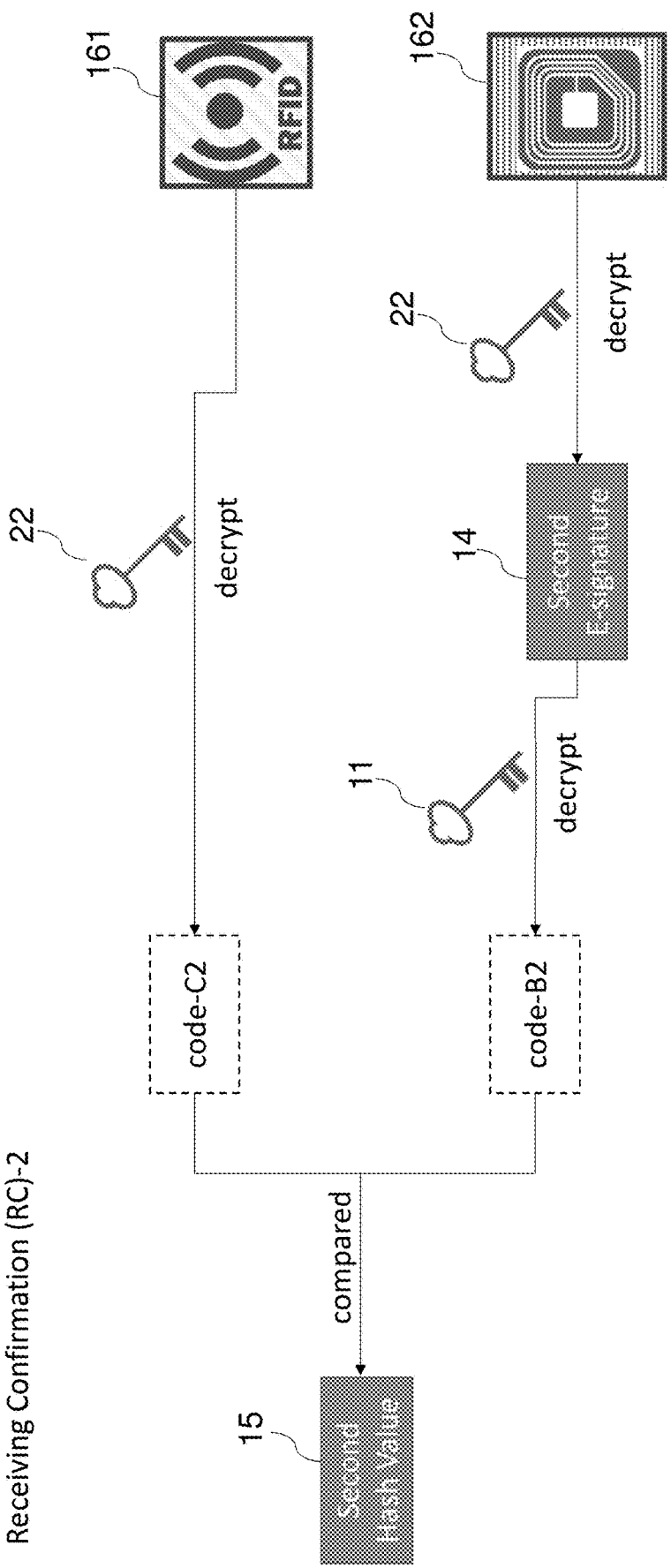
FIG. 8 is a diagram showing the process of a second method of the receiving confirmation in the secured mutual confirmation method in the present invention.

Referring to FIGS. 7 and 8, there are at least two methods for the buyer (20) to confirm the received product (13). For the first method, the buyer (20) can decode data saved in the RFID-b (162) with the second secret key (22) so as to get the second E-signature (14), and then the buyer (20) decodes the second E-signature (14) with the first public key (11) to get a code-B2. If the code-B2 is identical to the second hash value (15), the receiving of the product (13) is confirmed. For the second method, comparing with the first method, the buyer (20) needs to additionally decode the RFID-a (161) with the second secret key (22) to get a code-C2, and only if both of the buyer (20) and the seller (10) are correct, the code-C2 and the code-B2 are identical to the second hash value (15). In other words, if either the code-C2 or the code B2 is not identical to the second hash value (15), the confirmation is failed. If the receiving is confirmed, the buyer (20) can trust that the received product (13) is the same as what he/she ordered. Otherwise, there might be some manipulations of the product (13) occurred during the shipment. It is noted that the RFID-a (161) can be disposed at a position away from the RFID-b (162) to prevent the two RFIDs (161)(162) from being broken at the same time.

Figure 9:
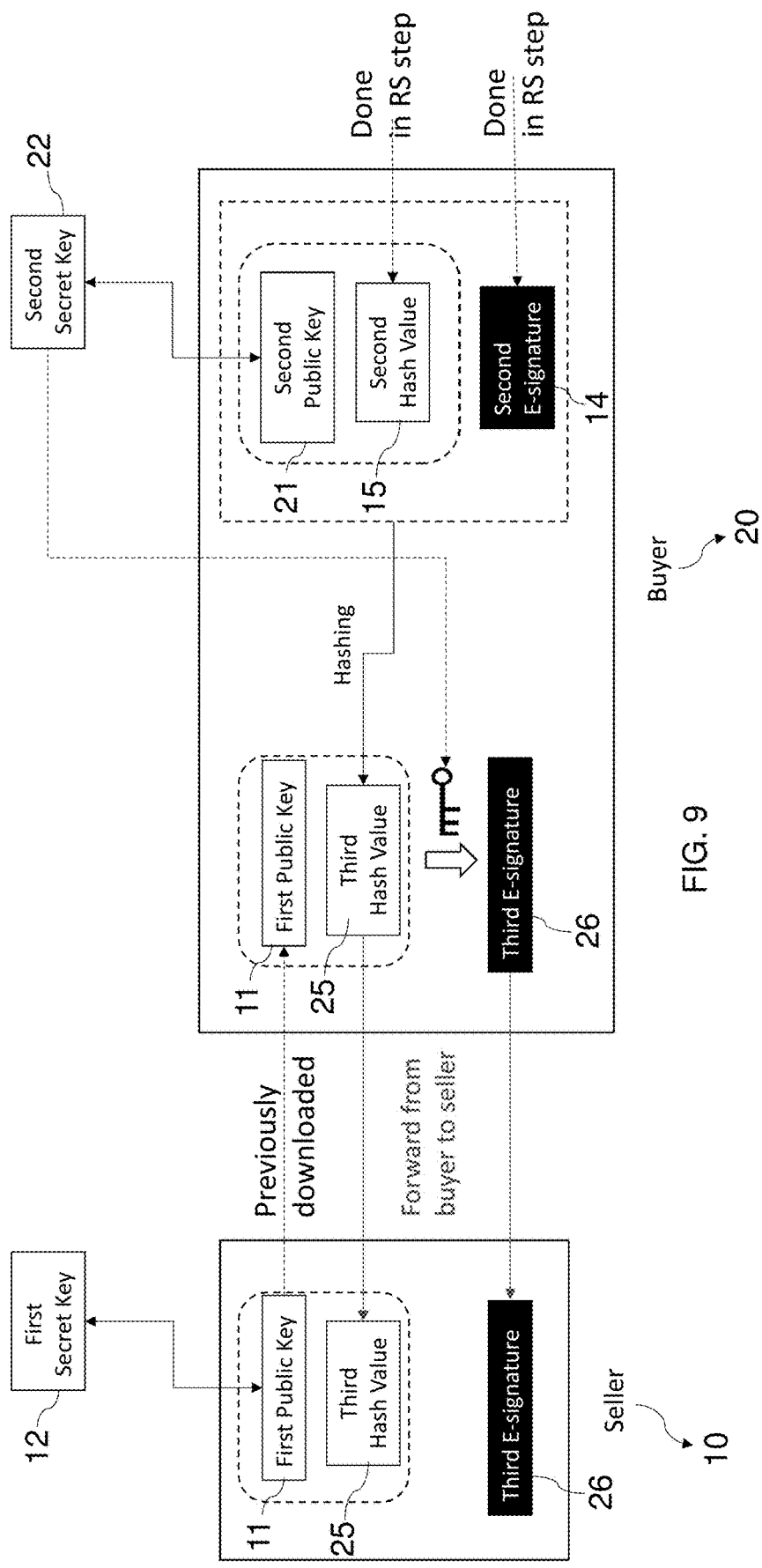
FIG. 9 is a diagram showing the process of shipment confirmation process between the seller and the buyer in the secured mutual confirmation method in the present invention.
Figure 10:
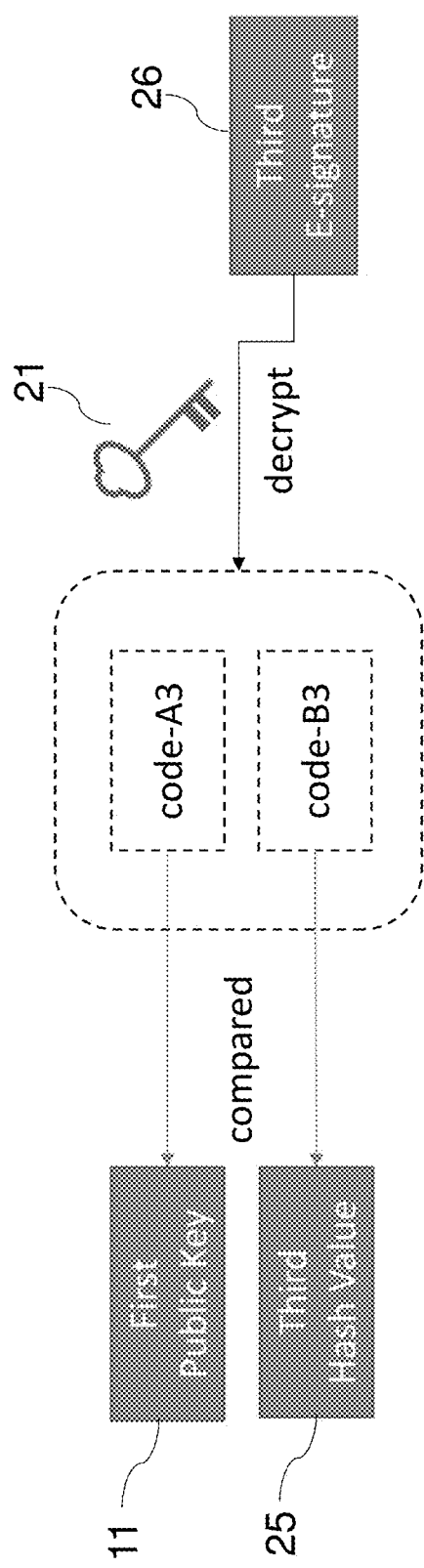
FIG. 10 is a diagram showing how the seller checks the shipment confirmation in the secured mutual confirmation method in the present invention.

The last transaction between the seller (10) and the buyer (20) is sending the request of shipment confirmation (SC) from the buyer (20). Referring to FIG. 9, after successfully receiving the product (13), the buyer (20) can send the SC to the seller (10). In the process of shipment confirmation (SC), the buyer (20) can generate a third hash value (25) by hashing the second public key (21), the second hash value (15) and the second E-signature (14), and then the buyer (20) generates a third E-signature (26) by encrypting the first public key (11) and the third hash value (25) with the second secret key (22). Thereafter, the buyer (20) sends the third E-signature (26) and the third hash value (25) to the seller (10). The final step of the SC process is that the seller (10) checks shipment confirmation by decoding the third E-signature (26) with the second public key (21) so as to generate a code-A3 and a code-B3, and if the code-A3 and the code-B3 are identical to the first public key (11) and the third hash value (25) respectively, the shipment is confirmed as shown in FIG. 10.

Comparing with conventional online transactions, the present invention is advantageous because all transactions in the system between the seller (10) and the buyer (20) are monitored and the messages therebetween are encrypted, which makes the online transaction more reliable and secured for both of the seller (10) and the buyer (20).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A method for tracing and verifying product identity, origin and authentication comprising a buyer sending out a purchase order (PO) to a seller; the seller receiving the PO and shipping the product to the buyer; and the buyer sending a shipment confirmation (SC) to the seller after receiving the product, wherein the buyer has a buyer public key and a buyer secret key indicating the buyer's identity, obtains a serial number of the product, and after ordering the product from the seller, the buyer, when processing the PO, generates a first hash value that includes the buyer public key, the serial number of the product and the selling price of the product, and a buyer E-signature by encrypting the first hash value and a seller public key through the buyer secret key, wherein the seller decodes the first E-signature with the buyer public key to generate a first code and a second code, and if the first code and the second code are identical to the seller public key and the first hash value respectively, the PO is confirmed, and the seller performs the shipping of the product by generating the second hash value through hashing the seller public key, the first hash value and the first E-signature, and generating a second E-signature by encrypting at least the second hash value with the seller secret key, and wherein the buyer sends out the shipment confirmation (SC) to the seller by generating a third hash value through hashing the buyer public key, the second hash value and the second E-signature, and generating a third E-signature by encrypting the seller public key and the third hash value with the buyer secret key.

2. The method for tracing and verifying product identity, origin and authentication of claim 1, wherein the buyer downloads a corresponding application to generate his/her own buyer public key and the buyer secret key.

3. The method for tracing and verifying product identity, origin and authentication of claim 1, wherein a first identifier is generated by encrypting the second hash value or both the buyer public key and the second hash value with the buyer public key, and a second identifier is generated by encrypting the second E-signature with the buyer public key; and the first and second identifiers are configured to be attached to, buried in or sealed in the product which is shipped to the buyer.

* * * * *